United States Patent Office 3,562,325
Patented Feb. 9, 1971

3,562,325
2-[N,N-(AMINO LOWER ALKYL)-(ARYLSULFONYL)]-AMINO BENZOPHENONES AND DERIVATIVES
Rodney Ian Fryer, North Caldwell, Earl Reeder, Nutley, and Leo Henryk Sternbach, Upper Montclair, N.J., assignors to Hoffmann-La Roche Inc., Nutley, N.J., a corporation of New Jersey
No Drawing. Original application Ser. No. Sept. 22, 1965, Ser. No. 489,381, now Patent No. 3,431,304. Divided and this application Sept. 10, 1968, Ser. No. 758,683
Int. Cl. C07c 143/78
U.S. Cl. 260—556                                                 8 Claims

ABSTRACT OF THE DISCLOSURE

Aniline derivatives having a leaving group on the nitrogen atom are described. Preferred compounds also contain an alkyl amino alkyl group on the foresaid nitrogen atom. The leaving group is preferably a tosyl group. These compounds are useful as intermediates in the preparation of benzophenone compounds having valuable therapeutic properties.

RELATED APPLICATIONS

This case is a division of Ser. No. 489,381, filed Sept. 22, 1965, now U.S. Pat. No. 3,431,304 entitled "Novel Benzophenone Derivatives and Therapeutics Useful Thereof."

SUMMARY OF THE INVENTION

The present invention relates to novel amino phenyl aryl ketones, imines and oxime derivatives thereof having a basic side chain attached to the aniline nitrogen and to processes for preparing same.

In one comprehensive aspect the invention relates to a method for reversing central nervous system depression which comprises administering to a warm blooded animal nontoxic physiological amount of a member selected from the group consisting of compounds of the formula

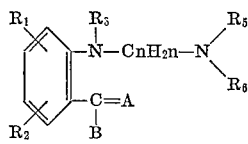

wherein $n$ is a whole integer from 2 to 7; A is selected from the group consisting of oxygen, NH, NOH and N-lower alkyl; B is selected from the group consisting of phenyl, pyridyl, preferably, 2- or 4- pyridyl, and $R_4$-phenyl, preferably, 2-$R_4$-phenyl wherein $R_4$ is selected from the group consisting of hydrogen, halogen, trifluoromethyl, nitro, lower alkyl and lower alkoxy; $R_1$ and $R_2$ are selected from the group consisting of hydrogen, halogen, lower alkyl, trifluoro-methyl, nitro amino and lower alkoxy; $R_3$ is selected from the group consisting of hydrogen, lower alkyl and lower alkenyl and $R_5$ and $R_6$ are selected from the group consisting of, individually, hydrogen and lower alkyl, and when taken together with the nitrogen atom, a mono-heterocyclic ring structure including at the most one further hetero atom selected from the group consisting of nitrogen and oxygen and at the most one further substituent on the heterocyclic ring nucleus and acid addition salts thereof and pharmaceutically acceptable acids. In a preferred aspect, $R_1$ is hydrogen. In the most preferred aspect, $R_1$ is hydrogen and $R_2$ is joined to the phenyl ring at the 5-position thereof.

In administering a compound of the Formulae I, II, III and IV to a warm blooded animal host, there is utilized from about 0.1 mg. to about 100 mg. thereof per kilogram of body weight of the said animal host, preferably, from about .1 mg. to about 30 mg. thereof per kilogram of body weight of the said animal host, and most preferably, from about .2 mg. to about 10 mg. thereof per kilogram of body weight of the said animal host.

In another comprehensive aspect, the present invention relates to novel compounds of the formula

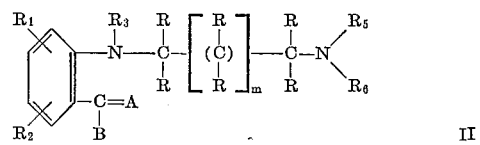

wherein $m$ is a whole integer from 1 to 5; A is selected from the group consisting of oxygen, NH, NOH and N-lower alkyl; B is selected from the group consisting of phenyl, pyridyl and $R_4$-phenyl wherein $R_4$ is selected from the group consisting of hydrogen, halogen, trifluoromethyl, nitro, lower alkyl and lower alkoxy; R is selected from the group consisting of hydrogen and lower alkyl; $R_1$ and $R_2$ are selected from the group consisting of hydrogen, halogen, lower alkyl, trifluoromethyl, nitro, amino and lower alkoxy; $R_3$ is selected from the group consisting of hydrogen, lower alkyl and lower alkenyl and $R_5$ and $R_6$ are selected from the group consisting of, individually, hydrogen and lower alkyl, and, when taken together with the nitrogen atom, a monoheterocyclic ring structure including at the most one further hetero atom selected from the group consisting of nitrogen and oxygen and, at the most, one further substituent on the heterocyclic ring nucleus; and acid addition salts thereof with pharmaceutically acceptable acids.

In a preferred aspect, all of the R's in Formula II above are selected from the group consisting of hydrogen or methyl. In a still more preferred embodiment, all of the R's are hydrogen. Advantageously, the sum of the carbon atoms contained in the substituents designated as R and the numerical value of the integer designated as $m$, is 5 or less. Thus, if $m$ is 2, the R groups contain collectively a total of 3 or less carbon atoms, e.g. at least three of the R groups are hydrogen and the remainder are methyl.

Due to their particularly advantageous usefulness in a therapeutic sense as a class, an especially preferred group of novel compounds are those of the Formula II above wherein the R groups are all hydrogen, $m$ is 1, one of $R_5$ and $R_6$ is lower alkyl and the other of $R_5$ and $R_6$ is hydrogen or lower alkyl, i.e. compounds of the formula

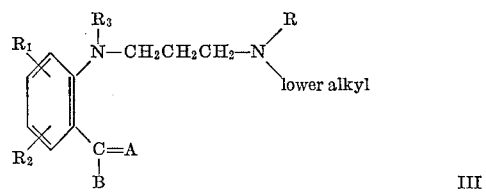

wherein R, $R_1$, $R_2$, $R_3$, A and B are as above and their acid addition salts with pharmaceutically acceptable acids. Most preferred among this grouping are compounds of Formula III above wherein $R_3$ is hydrogen.

Another group of novel compounds included within the purview of the invention disclosed herein are those of the formula

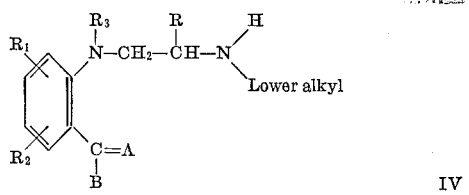

wherein R, $R_1$, $R_2$, $R_3$, A and B are as above and their acid addition salts with pharmaceutically acceptable acids.

The expression "lower alkyl" as utilized herein unless otherwise specified is intended to connote a straight or branched chain hydrocarbon group having 1 to 7 carbon atoms in the chain, such as methyl, ethyl, propyl, isopropyl, butyl and the like. The term "halogen" as used herein represents all four halogens, namely, bromine, chlorine, iodine and fluorine, unless otherwise stated. The expression "lower alkoxy" as utilized herein designates a straight or branched chain, saturated hydrocarbonoxy group such as methoxy, ethoxy, isopropyloxy and the like. The expression "lower alkenyl" represents a straight or branched chain ethylenically unsaturated hydrocarbon group having 1 to 7 carbon atoms in the chain such as allyl and the like. The grouping

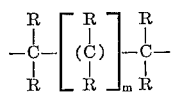

included in Formula II above wherein each of the R groups are hydrogen can represent a straight chain alkylene group such as, preferably, trimethylene, tetramethylene or pentamethylene. When one or more of the R's are other than hydrogen, then the grouping

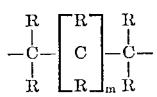

of Formula II above can represent an alkylene group having lower alkyl substituents thereon such as a 1-methyl-propylene group, a 2-methyl-propylene group, a 1-methyl-butylene group, a 3,3-dimethyl-propylene group and the like. As is noted above, the sum of the number of carbon atoms contained in all of the substituents identified as R in Formula II above and the value of the whole integer represented by $m$ preferably does not exceed 5.

The symbols $R_6$ and $R_5$ have the following significance: $R_6$ and $R_5$, when taken individually, represent hydrogen or straight or branched chain hydrocarbon groups having from 1 to 7 carbon atoms in the chain such as methyl, ethyl, propyl, isopropyl, butyl and the like.

Thus, the

radical can represent amino, mono-lower alkyl amino, and di-(lower alkyl)amino; $R_5$ and $R_6$, when together, can comprise divalent groups which together with the nitrogen atom to which they are attached form a 5- or 6-membered monoheterocyclic ring structure. Preferably, the last-mentioned ring structure is selected from the group consisting of piperazinyl, piperidinyl, pyrrolidinyl, morpholinyl and substituted derivatives thereof. If the heterocyclic ring structure is substituted, the latter contains an additional nitrogen atom to which the substituent atom or group is adjoined. Among such substituents may be included branched or straight chain lower alkyl groups such as methyl, ethyl, isopropyl and the like, hydroxy lower alkyl groups, such as hydroxy ethyl and the like, lower alkenyloxy-lower alkyl groups such as vinyl-oxy alkyl and lower alkoxy-lower alkyl groups such as ethoxyethy and the like. In a particular advantageous embodiment of this aspect of the present invention, one of $R_5$ and $R_6$ is lower alkyl and the other of $R_5$ and $R_6$ is hydrogen or lower alkyl. Especially preferred are those compounds wherein $R_5$ and $R_6$ are both lower alkyl.

As is evident from the above, the radical

can represent a saturated 5- or 6-membered heterocyclic radical of the type identified below.

Piperidino
(lower alkyl)piperidino
(lower alkoxy)piperidino
2,3 or 4-piperidyl
2,3 or 4-(N-lower alkyl-piperidyl)
pyrrolodino
(lower alkyl)-pyrrolidino
(lower alkoxy)pyrrolidino
2- or 3-pyrrolidyl
2- or 3-(N-lower alkyl pyrrolidyl)
Morpholino
(lower alkyl)piperazino
(hydroxy-lower alkyl)piperizino
(lower alkenyl-oxy-lower alkyl)piperazino
(lower alkoxy-lower alkyl)piperazino
piperazino Thus, when $R_5$ and $R_6$ combine to form a ring, the said heterocyclic ring structure so-formed is preferably saturated and contains 5- or 6-members in the ring. Thus, $R_5$ and $R_6$ when taken together, can represent, for example, a lower alkylene chain such as polymethylene chain of 4–5 carbon atoms, a lower alkyleneoxylower alkylene chain or a lower alkylene-aza-lower alkylene chain.

In addition to the compounds encompassed by Formulas I, II, III and IV above, there is also included within the purview of the present invention, the pharmaceutically acceptable acid addition salts of said compounds. The compounds of Formula I above (and, of course, the compounds of Formulas II, III and IV above encompassed thereby) form pharmaceutically acceptable acid addition salts with 1 or more mole equivalents of said acid depending upon the number of basic nitrogen atoms present. For example, they form salts with inorganic and organic acids such as hydrochloric acid, hydrobromic acid, citric acid, phosphoric acid, tartaric acid, salycilic acid, toluene-sulphonic acid, ascorbic acid, nitric acid, succinic acid, formic acid and the like.

Compounds of Formulas I, II, III and IV above, as well as their pharmaceutically acceptable acid addition salts as is noted above are characterized by their antidepressant action on the central nervous system and are useful, not only in the relief of symptomology associated with depression of the central nervous system, but are also useful in the prevention and reversal of central nervous system depression caused by exogenous chemical agents.

Ketones, oximes and imines of the formula

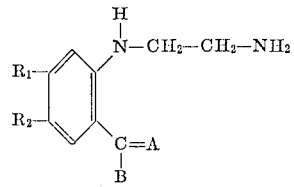

wherein $R_1$, $R_2$, A and B are as above having been known heretofore. However, such type compounds were thought to be only useful in the preparation of other therapeutically useful compounds. The present applicants have unexpectedly found that compounds of Formula V above are valuable anti-depressant agents and this finding of heretofore unknown utility constitutes a part of the present invention.

The compounds of Formulas I, II, III and IV above can be prepared by a wide variety of reaction routes.

In one such reaction route, a compound of the formula

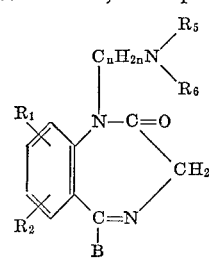

wherein $n$, B, $R_1$, $R_2$, $R_5$ and $R_6$ are as above are hydrolyzed with any suitable acid to prepare the corresponding compound of Formula I above wherein A is oxygen. For example, if the "$CnH_2n$" group in compounds of Formula VI above corresponds to a propyl group and such compounds are treated with a mineral acid, under hydrolysis conditions, there results compounds of the formula

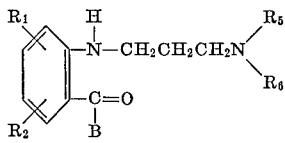

wherein $R_1$, $R_2$, $R_5$, $R_6$ and B are as above.

Among the acid agents suitable for such a conversion of compounds of Formula VI above to the corresponding compounds of Formula I above wherein $R_3$ is hydrogen may be included mineral acids, such as sulfuric acid, nitric acid, polyphosphoric acid, hydrohalic acids, e.g. hydrochloric acid and the like. In the preparation of compounds of Formula I, II, III and IV above from the compounds of Formula VI above in the manner outlined hereinabove, temperature and pressure are not critical. Thus, the reaction can be effected at room temperature and atmospheric pressure or above or below room temperature. Advantageously, elevated temperatures are utilized. It is most preferred to run the reaction at about the reflux temperature of the reaction mixture.

Still another technique for preparing compounds of Formula I above involves reacting a compound of the formula

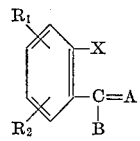 VII wherein $R_1$, $R_2$, A and B are as above and X is halogen, preferably, selected from the group consisting of chlorine, bromine and iodine, with a compound of the formula $$NH_2—(CnH_2n)—NH_2 \quad \text{VIII}$$

wherein $n$ is as above whereby to prepare the corresponding compounds of the Formula I above wherein $R_5$ and $R_6$ are both hydrogen.

In a preferred embodiment, elevated temperatures are utilized when effecting the conversion of compounds of Formula VII above to compounds of Formula I above wherein $R_5$ and $R_6$ are both hydrogen, e.g., at an elevated temperature above about 75° C. Representative of compounds of Formula VIII above suitable for the purposes of this aspect of the present invention are, for example, 1,3-propane diamine, 1,3-(2-methyl propane)-diamine, 1,3 - butane-diamine and the like. The compound of Formula VIII above utilized can be present in excessive amounts whereby it serves per se as the reaction medium. In an alternate procedure, any conveniently available non-reactive organic solvent such as N,N-dimethylformamide, dimethyl sulfoxide, or an amine, a lower or higher alkanol such as pyridine, picoline, quinoline and the like can be used as the reaction medium.

Another preparative technique for preparing compounds of the Formula I above comprises reacting a compound of the formula

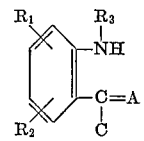

wherein R, $R_1$, $R_3$, A and B are as above with a compound of the formula

halo-$CnH_2n$-halo wherein $n$ is as above and treating the so-formed compound of the formula

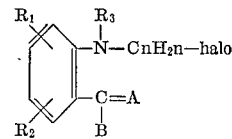

wherein $n$, $R_1$, $R_2$, $R_3$, A and B are as above with a member selected from the group consisting of ammonia, a primary amine of the formula $RNH_2$ wherein R is as above and a secondary amine of the formula

wherein $R_5$ and $R_6$ are as above in the presence of an alkali such as sodium hydroxide and the like and any suitable inert organic solvent. When ammonia is utilized; compounds of the Formula I above result wherein $R_5$ and $R_6$ are both hydrogen. When a primary amine is utilized, compounds of Formula I above result wherein one of $R_5$ and $R_6$ is hydrogen and the other of $R_5$ and $R_6$ is lower alkyl. When a secondary amine is utilized, compounds of Formula I above result wherein $R_5$ and $R_6$ are both lower alkyl, or when taken together a monoheterocyclic ring structure of the type more fully described hereinabove.

The N-mono lower alkyl derivatives of the compounds of Formula I above wherein $R_5$ and $R_6$ are both hydrogen can be prepared by refluxing the primary amine with ethyl formate to yield the N-formyl derivative thereof. The so prepared N-formyl compound is then refluxed with sodium hydride and for example methyl iodide in diethylene glycol dimethylether yielding compounds of the formula

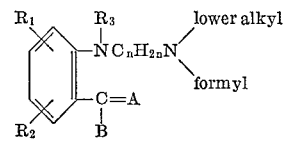

wherein $n$, $R_1$, $R_2$, $R_3$, A and B are as above which upon hydrolysis by refluxing in hydrochloric acid, yields compounds of Formula I above wherein one of $R_5$ and $R_6$ is hydrogen and the other of $R_5$ and $R_6$ is lower alkyl.

The N-di lower alkyl derivatives of compounds of Formula I above wherein $R_5$ and $R_6$ are both lower alkyl are obtained by alkylation of the corresponding primary amines of Formula I above with a mixture of an appropriate aqueous aldehyde and an appropriate lower alkanoic acid. The example, compounds of Formula I above wherein $R_5$ and $R_6$ are both methyl can be prepared from the corresponding primary amines of Formula I above, i.e. wherein $R_5$ and $R_6$ are both hydrogen, by methylation of the last-mentioned primary amine with a mixture of aqueous formaldehyde and formic acid.

Compounds of Formulae I, II, III and IV above wherein A is an NOH group (an oxime) can be prepared from the corresponding compound of Formulae I, II, III and IV above wherein A is oxygen (a ketone) by reacting the last-mentioned compound with hydroxylamine. This reaction is preferably effected in the presence of any suitable inert organic solvent such as pyridine or ethanol.

Compounds of Formulas I, II, III and IV above wherein A is an NH group or an N-lower alkyl group can be prepared from the corresponding compound of Formulas I, II, III and IV above wherein A is oxygen (a ketone) by reacting such compounds with ammonia or a primary amine under pressure. The reaction with ammonia results in compounds of Formulas I, II, III and IV above wherein A is an NH group. The reaction of compounds of Formulas I, II, I and V above with a primary amine results in the corresponding compounds wherein A is an N-lower alkyl group.

Compounds corresponding to Formulas I through IV above wherein $R_3$ is hydrogen can be modified so that $R_3$ is other than hydrogen by a variety of methods. For example, compounds of Formulas I through IV above wherein $R_3$ is other than hydrogen can be obtained by reacting corresponding compounds wherein $R_2$ is hydrogen with diazoalkanes, e.g. diazomethane, di-lower alkyl sulfates, e.g. dimethyl sulfate, lower alkyl halides, e.g. methyl iodide and lower alkenyl halides, e.g. allyl bromide in a medium such as ether, benzene, an alcohol (ethanol), dimethyl-formamide, dioxane and the like. Suitably, the reaction is effected utilizing sodium methoxide, sodium hydride and the like to form the sodio derivative of the 2-position nitrogen atom of compounds of Formulae I through IV above and reacting the so-called sodio derivative with an equivalent amount or an excess of the appropriate alkylating agent or alkenylating agent.

Another method of preparing compounds of Formula IV above involves reacting a quaternary compound containing a cation of the formula

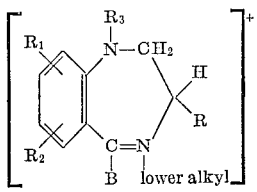

wherein R, $R_1$, $R_2$, $R_3$ and B are as above with a base. This procedure is especially advantageous in preparing compounds of the Formula IV above wherein $R_3$ is other than hydrogen.

The last-mentioned reaction is preferably effected in an aqueous medium which may include an inert organic solvent miscible with water such as methanol, ethanol and the like. The base utilized may be represented by alkali metal hydroxides, e.g. sodium hydroxide, alkaline earth metal hydroxides, e.g. calcium hydroxide and the like. Any suitable temperature may be employed during this reaction step. However, it is preferred to operate at temperatures below room temperature.

As is noted above, the compounds of Formula I above as well as their pharmaceutically acceptable acid addition salts are characterized by their ability to reverse central nervous system depression and hence are useful as antidepressants. They can be administered internally, for example, parenterally or enterally in conventional pharmaceutical dosage forms with dosage adjusted to fit the exigencies of a particular therapeutic situation. The pharmaceutical dosage forms can be prepared by incorporating the active ingredient in liquid or solid vehicles to form elixirs, tablets, capsules, suspensions, suppositories and the like.

Compounds of Formula I above can also be formed by reacting a tosyl group-containing aniline derivative of the formula

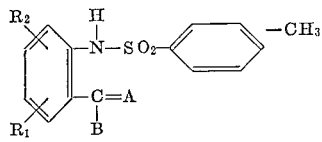 IX wherein A, B, $R_1$ and $R_2$ are as above with a compound of the formula

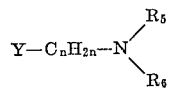

wherein Y is selected from the group consisting of chlorine, bromine and iodine and $R_5$ and $R_6$ are as above preferably after first replacing the hydrogen atom on the nitrogen atom of the compound of the Formula IX above to which the tosyl group is joined with a sodio atom, utilizing, for example, sodium hydride, sodium methoxide and the like thereby preparing a compound of the formula

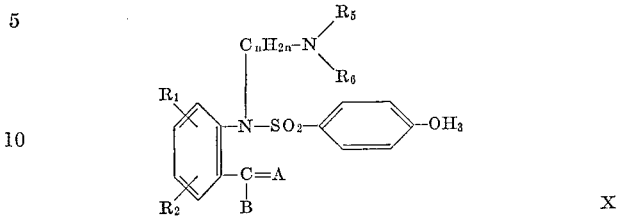 X wherein $n$, A, B, $R_1$, $R_2$, $R_5$ and $R_6$ are as above and subsequently splitting off the tosyl group. An efficacious way of removing the tosyl group whereby to prepare the corresponding compound of Formula X above is heating a compound of Formula X above in the presence of a suitable proton-donating acid agent such as sulfuric acid and the like.

While a tosyl group is illustrated hereinabove as the leaving group in the compounds of Formulas IX and X above, it is of course to be understood that any equivalent leaving group such as another aryl sulfonyl group, e.g. benzene sulfonyl and the like or an acyl moiety such as acetyl and the like can be present in the compounds of the Formulas IX and X above in place of the tosyl group. Preferably, the leaving group is selected from the group consisting of acyl, benzene sulfonyl and derivatives thereof. However, all that is required of the leaving group is that it function efficaciously in this process aspect, that is, that it be a suitable leaving group for the purposes of the present invention.

When preparing compounds of the formula

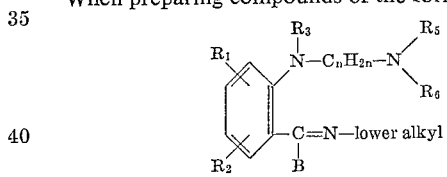

wherein B, $n$, $R_1$, $R_2$, $R_3$, $R_5$ and $R_6$ are as above via the reaction of compounds of Formula I above, wherein A is oxygen with a primary amine under pressure in the manner outlined hereinabove, compounds of the formula

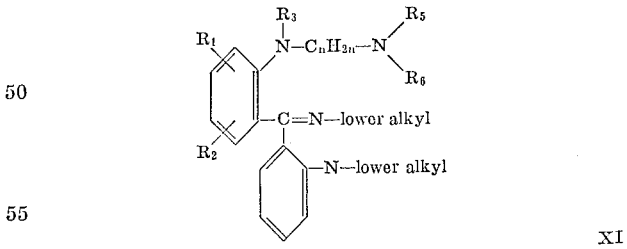 XI wherein $R_1$, $R_2$, $R_3$, $R_5$, $R_6$ and $n$ are as above also result.

Compounds of Formula XI above can be treated with a strong acid to effect conversion thereof to compounds of the formula

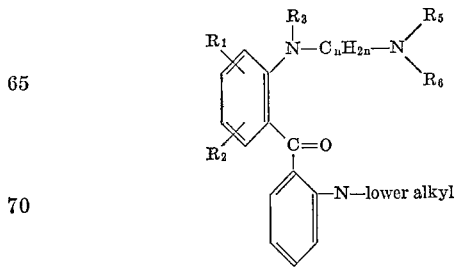

which in turn can be transformed into compounds having an oxime group or an imine group, respectively, via the reaction thereof with hydroxylamine and ammonia under pressure as described above.

Thus, there is further included within the purview of the present invention compounds of the formula

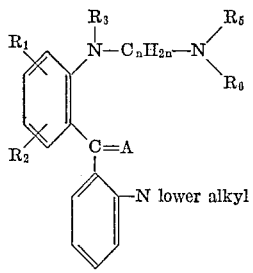

XII wherein $R_1$, $R_2$, $R_3$, $R_5$, $R_6$ and A are as above. Compounds of Formula XII are anti-depressants.

The following examples are illustrative, but not limitative of the present invention. All temperatures stated therein are in degrees centigrade.

EXAMPLE 1

To 161 g. (0.360 m.) of 7-chloro-1-(3-dimethylamino propyl) - 5- (2-fluorophenyl)-1,3-dihydro-2H-1,4-benzodiazepin-2-one dihydrochloride, there was added 900 ml. of ethanol, and 900 ml. of 3 N HCl. The solution was then heated under reflux for 8 hours. Most of the ethanol was removed under reduced presssure and the remaining solution was made basic (>pH 9; Hydrion papers) with concentrated ammonium hydroxide, keeping the solution at approximately room temperature by the addition of ice. The reaction mixture was extracted with methylene chloride (2× 300 ml.); the organic extracts were combined, washed with 200 ml. of brine and then dried over anhydrous sodium sulfate. The so washed and dried extracts were evaporated to dryness after the addition of 100 ml. of benzene. 127 g. of the oil thus obtained was dissolved in 200 ml. of petroleum ether, and filtered (without suction) through a column containing 400 g. of Grade I neutral alumina. Elution with 1300 ml. of petroleum ether gave a first fraction which upon evaporation yielded 5-chloro-2-(3-dimethylaminopropyl)-amino-2'-fluorobenzophenone as in an oil. The oily so-obtained was dissolved in 160 ml. of methanol and 40 ml. of 8.46 N methanolic HCl (10% excess) was added. To the adduct, there was slowly added 800 ml. of ether, and the resultant solution was cooled overnight. The product was filtered, washed with ether and dried overnight at 55° to give 5-chloro-2-(3-dimethylaminopropyl)-amino-2'-fluorobenzophenone hydrochloride as yellow rods having a melting point of 172–174°.

EXAMPLE 2

A solution of 23.2 g. 86 mmole) of 7-chloro-2,3-dihydro-1-methyl-5-phenyl-1H-1,4 - benzodiazepine in 250 ml. of benzene and 100 mmole of dimethylsulfate was refluxed overnight. The solvent was removed in vacuo and the residue recrystallized from methylene chloride-ether giving 7-chloro-2,3-dihydro-1,4-dimethyl-5-phenyl-1H-1,4-benzodiazepin-4-ium methyl sulfate as orange prisms, M.P. 118–126°.

A solution of 30.6 g. (78 mmole) of 7-chloro-2,3-dihydro-1,4-dimethyl-5-phenyl-1H - 1,4 - benzodiazepin - 4-ium methyl sulfate in 50 ml. of water was stirred at 0°. An equimolar amount of sodium hydrqxide (78 mmole) in 50 ml. of water chilled to 0° was added dropwise to the aqueous medium over a period of 30 minutes. After the addition was about half completed, 50 ml. of ether was added to dissolve the free base formed. The reaction mixture was extracted with ether, dried over magnesium sulfate and concentrated in vacuo giving 5-chloro-2-(2-methylaminoethylmethylamino)-benzophenone. The base was dissolved in ether and the ethereal solution was treated with hydrogen bromide yielding 5-chloro-2-(2-methylaminoethylmethylamino)benzophenone dihydrobromide, melting point 150–160°. Recrystallization from acetone gave the product as yellow prisms, M.P. unchanged. Additional recrystallizations from isopropanol-ether gave yellow prisms, melting point 145-150° of the monohydrobromide.

EXAMPLE 3

A solution of 10 g. (31.7 mmole) of 7-bromo-5-(4-pyridyl)-3H-1,4-benzodiazepin-2(1H)-one in 150 ml. of freshly distilled dimethylformamide under dry nitrogen was stirred for 4 hours at room temperature with 1.95 g. (50 mmole) of sodamide. A dried chloroform solution of 1-chloro-3-(dimethylamino)propane (excess) was added and the reaction mixture stirred overnight. The reaction mixture was diluted with 300 ml. of water and extracted with chloroform. The chloroform extract was washed three times with water, dried over magnesium sulfate and concentrated in vacuo to a dark oil. The oil was washed five times with 100 ml. portions of hexane and the insoluble solid extracted continuously with hexane over a period of 20 hours. The hexane solutions were combined and concentrated to about 250 ml. Upon standing overnight, a precipitate formed which was separated by filtration. Removal of the hexane gave an oil. Crystallization of the oil gave colorless prisms, melting point 92–97° from ether-hexane. Two recrystallizations from ether-cyclohexane gave colorless prisms of 7-bromo-1-(dimethylaminopropyl)-5-(4-pyridyl)-3H - 1,4 - benzodiazepin-2(1H)-one, melting point 97.5–99°.

A solution of 1.0 g. (2.5 mmole) of 7-bromo-1-(dimethylaminopropyl) - 5 - (4 - pyridyl) - 3H - 1,4 - benzodiazepin-2(1H)-one in 35 ml. of a 1:1 mixture of 6 N hydrochloric acid and ethanol was refluxed 7 hours. The reaction mixture was made basic with 3 N sodium hydroxide and extracted four times with ether. The combined ether extracts were dried over magnesium sulfate and concentrated in vacuo to give 4-[5-bromo-2-(3-dimethylaminopropylamino)benzoyl]pyridine. An ethanolic solution of the base was treated with maleic acid and the salt recrystallized from ethanol-ether giving 4-[5-bromo - 2 - (3 - dimethylaminopropylamino)benzoyl] pyridine maleate as yellow prisms, melting point 148–151°. Recrystallizations from ethanol-ether raised the melting point of the salt to 151–152°.

EXAMPLE 4

A solution of 36.9 g. (0.1 mole) of 7-chloro-1-(2-diethylaminoethyl) - 5 - phenyl - 3H - 1,4 - benzodiazepin-2(1H)-one in 200 ml. of ethanol and 200 ml. of 3 N hydrochloric acid was stirred at reflux for 8 hours. The ethanol was removed in vacuo and the residue poured into an excess of iced ammonium hydroxide. The basic mixture was extracted with methylene chloride. The methylene chloride extract was dried over magnesium sulfate and concentrated in vacuo to give 2[(2-di-ethylaminoethyl)amino]-5-chlorobenzophenone. An ethereal solution of this base was treated with hydrogen chloride giving after recrystallization from isopropanol, 2[(2-diethylaminoethyl)amino] - 5 - chlorobenzophenone hydrochloride hemihydrate as yellow prisms, melting point 197–199°.

EXAMPLE 5

A solution of 17 g. of 7-chloro-1-(2-diethylaminoethyl) - 5 - (2 - fluorophenyl) - 1,3 - dihydro - 2H - 1,4-benzodiazepin-2-one dihydrochloride in a mixture of 200 ml. of ethanol and 200 ml. of 3 N hydrochloric acid was heated under reflux for 18 hours. Ethanol was removed under reduced pressure and the residue made basic with ammonium hydroxide. The product was extracted into ether (2× 100 ml.). The ether extracts were combined, washed with water, dried and evaporated leaving a yellow oil. The yellow oil thus obtained was dissolved in hexane and chromatographed over activated neutral alumina. The petroleum ether (B.P. 30–60°) fraction from the column which contained 5-chloro-2-(2-diethylaminoethyl)amino-2'-fluorobenzophenone was concentrated. The concentrate was dissolved in ether which was then saturated with dry hydrogen chloride. 5-chloro-2-(2-diethylaminoethyl)amino-2'-fluorobenzophenone hydrochloride precipitated as a yellow crystalline salt of melting point 134–143° and was separated by filtration.

EXAMPLE 6

A solution of 17 grams of 7-chloro-1-(3-diethylaminopropyl) - 5 - (2 - fluorophenyl) - 1,3 - dihydro - 2H - 1,4-benzodiazepine-2-one dihydrochloride in a mixture of 200 ml. of ethanol and 200 ml. of 3 N hydrochloric acid was heated under reflux for 18 hours. Ethanol was removed under reduced pressure and the residue made basic with ammonium hydroxide. The basic medium was extracted with ether (2× 100 ml.). The ether extracts were combined, washed with water, dried and evaporated leaving an oil. The oil so obtained was dissolved in hexane. The hexane solution was put on a column of activated neutral alumina and chromatographed with petroleum ether (B.P. 30–60°). The petroleum ether fraction which contained 5-chloro-2-(3-diethylaminopropylamino)-2'-fluorobenzophenone was concentrated. The concentrate was added to an ether-acetone mixture which was then saturated with dry hydrogen chloride yielding 5-chloro-2-(3-diethylamino - propylamino) - 2' - fluorobenzophenone hydrochloride as bright yellow prisms, melting point 114–117°.

EXAMPLE 7

A solution of 17 grams of 7-bromo-1,3-dihydro-1-(3-dimethylaminopropyl) - 5 - (2 - pyridyl) - 2H - 1,4 - benzodiazepine-2-one dihydrochloride in a mixture of 200 ml. of ethanol and 200 ml. of 3 N hydrochloric acid was heated under reflux for 18 hours. Ethanol was removed under reduced pressure and the residue made basic with ammonium hydroxide. The basic medium was extracted with ether (2× 100 ml.). The ether extracts were combined, washed with water, dried and evaporated leaving an oil. Chromatography of the crude product over neutral activated alumina gave upon evaporation of the ethyl acetate fraction from the column 2-[5-bromo-2-(3-dimethylaminopropylamino)-benzoyl]pyridine as a yellow oil. The oil was dissolved in a small amount of ethanol and dry hydrogen chloride was bubbled into the solution. The addition of ether caused 2-[5-bromo-2-(3-dimethylaminopropylamino) - benzoyl]pyridine dihydrochloride hemihydrate to precipitate as orange rods of melting point 177–185° (with decomposition).

EXAMPLE 8

17 grams of 7-chloro-1,3-dihydro-1-(3-dimethylaminopropyl)-5-phenyl-2H-1,4-benzodiazepin-2-one in a mixture of 200 ml. of ethanol and 200 ml. of 3 N hydrochloric acid was heated under reflux for 18 hours. Ethanol was removed under reduced pressure and the residue made basic with ammonium hydroxide. The basic medium was extracted with ether (2× 100 ml.) and the ether extracts were combined, washed with water, dried and evaporated leaving an oil. The oil thus obtained was dissolved in hexane and chromatographed over active neutral alumina. Evaporation of the ethyl acetate fraction from the column yielded 5-chloro-2-(3-dimethylaminopropylamino)benzophenone as an oil. The free base thus obtained was dissolved in isopropanol. After passing dry hydrogen chloride into the isopropanol solution and adding ether, 5 - chloro - 2 - (3-dimethylaminopropylamino)-benzophenone hydrochloride precipitated. Recrystallization from methanol, ether mixture gave the salt as yellow prisms of melting point 157–163°.

EXAMPLE 9

A solution of 5.5 g. of 7-chloro-5-(2-fluorophenyl)-1,3 - dihydro - 1 - (3-piperazinopropyl) - 2H-1,4-benzodiazepin-2-one in a mixture of 50 ml. of ethanol and 50 ml. of 3 N hydrochloric acid was refluxed for 5 hours. The ethanol was removed under reduced pressure and the residue made alkaline with ammonium hydroxide. The resultant oil was extracted with dichloromethane, washed with brine, dried over anhydrous sodium sulfate, filtered and concentrated to small volume. The so-concentrated dichloromethane solution was put on a column of "Woelm" Grade I neutral alumina and chromatographed with ethyl acetate to give a viscous, yellow oil. The oil was treated with a solution of maleic acid in methanol and let stand overnight. Filtration yielded bright yellow crystals of 5-chloro - 2 - (3-piperazinopropylamino)-2' - fluorobenzophenone dimaleate melting point 157–159°.

EXAMPLE 10

A solution of 6 g. of 7-chloro - 5 - (2-fluorophenyl)-1,3-dihydro - 1 - [3-(4-methylpiperazino)propyl] - 2H-1,4-benzodiazepin-2-one in a mixture of 50 ml. of ethanol and 50 ml. of 3 N hydrochloric acid was refluxed for 4 hours. Ethanol was removed under reduced pressure and the residue made alkaline with ammonium hydroxide. Extraction with dichloromethane, followed by washing with brine, drying over anhydrous sodium sulfate, filtration, concentration of the dichloromethane extract to a small volume and chromatography over "Woelm" neutral alumina with ethyl acetate gave a yellow oil. The resultant oil was dissolved in methanol and treated with a methanol solution of maleic acid. Filtration gave a yellow solid. Recrystallization from ethanol gave brilliant yellow prisms of 5-chloro - 2 - [3-(4 - methylpiperazino)-propylamino]-2'-fluorobenzophenone dimaleate melting point 185–188°.

EXAMPLE 11

A solution of 3.5 grams of 7-chloro-5-(2-fluorophenyl)-1,3 - dihydro-1-{3-[4 - (2-hydroxyethyl)piperazine]propyl}-2H-1,4-benzodiazepin-2-one in a mixture of 50 ml. of ethanol and 50 ml. of 3 N hydrochloric acid was refluxed for 6 hours. Ethanol was removed under reduced pressure and the residue made alkaline with ammonium hydroxide. The so-formed alkaline medium was extracted with dichloromethane. The dichloromethane extract was washed with brine (3 × 100 ml.) and dried over anhydrous sodium sulphate. Concentration of the filtrate to a small volume, chromatography using 35 grams of neutral alumina and elution with ethyl ether gave 5 - chloro - 2-{3-[4-(2 - hydroxy - ethyl)piperazino]propylamino} - 2'-fluorobenzophenone as a yellow oil. The yellow oil was treated with a methanol solution of 2 grams of maleic acid. Filtration gave a yellow solid which after recrystallization from acetone gave small yellow needles of 5-chloro - 2{3 - [4 - (2-hydroxyethyl)piperazino]propylamino} - 2' - fluorobenzophenone dimaleate as yellow needles melting point 166–167°.

EXAMPLE 12

A solution of 6 grams of 7-chloro - 5 - (2-fluorophenyl)-1,3-dihydro - 1 - {3-[4 - (2-vinyloxyethyl)piperazino]-propyl}-2H-1,4-benzodiazepin-2-one in a mixture of 85 ml. of 3 N hydrochloric acid and 75 ml. of ethanol was refluxed for 9 hours. The ethanol was removed under reduced pressure and the residue was made alkaline with ammonium hydroxide. The alkaline medium was extracted with dichloromethane. The dichloromethane extract was washed with brine (3× 150 ml.) dried over anhydrous sodium sulphate, filtered and the filtrate concentrated to a small volume. The so-concentrated dichloromethane solution was put on a column of neutral alumina and chromatographed with a 50–50 (v./v.) mixture of ethyl ether-ethyl acetate yielding 5-chloro - 2 - {3-[4-(2-vinyloxyethyl)piperazino]propylamino}2'-fluorobenzophenone as a yellow oil. The yellow oil was treated with a methanolic solution of maleic acid. After allowing the resultant solution to stand overnight, the solid was filtered and recrystallized from acetone to give 5 - chloro - 2 - {3-[4-(2-vinyloxyethyl)piperazino]propylamino} - 2' - fluorobenzophenone dimaleate as bright yellow prisms of melting point 140–142°.

EXAMPLE 13

A solution of 4.8 grams of 7-chloro - 1 - {3-[4-(ethoxyethyl)-1-piperazino]propyl} - 5 - (2-fluorophenyl)-1,3-dihydro - 2H - 1,4-benzodiazepin - 2 - one trimaleate in 85 ml. of 3 N hydrochloric acid and 80 ml. of ethanol was refluxed for ten hours. The ethanol was removed under reduced pressure and the residue made alkaline with ammonium hydroxide. The so-formed alkaline medium was extracted with dichloromethane. The dichloromethane extract was washed with brine, dried over anhydrous sodium sulphate, filtered and the filtrate concentrated to a small volume. The so-concentrated dichloromethane solution was put on a column of neutral alumina and chromatographed with ethyl acetate to give 5-chloro-2-{3-[4 - (2 - ethoxyethyl)piperizino]propylamino} - 2'-fluorobenzophenone as a yellow oil. Treatment of the yellow oil with a solution of maleic acid in methanol gave, after allowing the resultant solution to stand overnight, a yellow solid. Recrystallization of the salt from acetone yielded yellow prisms of 5-chloro - 2 - {3-[4-(2-ethoxyethyl)piperazino]-propylamino} - 2' - fluorobenzophenone dimaleate, melting point 153–155°.

EXAMPLE 14

A mixture of 7.3 g. (0.02 mole) of 7-chloro - 1 - (3-chloropropyl) - 5 - (2-fluorophenyl) - 1,3-dihydro-2H-1,4-benzodiazepin-2-one, 3.0 g. (0.02 mole) of sodium iodide, 7 g. (0.08 mole) of morpholine and 75 ml. of methylethyl ketone was refluxed for 22 hours. Solvents were removed under reduced pressure and the residue was partitioned between water and dichloromethane. The dichloromethane extract was washed with brine and the product extracted into 3 N hydrochloric acid. The acid extracts were combined, made basic with ammonium hydroxide and the product re-extracted with dichloromethane. The last-mentioned dichloromethane extracts were washed with brine, dried over sodium sulfate and concentrated to give a yellow oil. The oil was treated with a solution of maleic acid in methanol. The white solid which formed was recrystallized from methanol yielding colorless platelets of 7-chloro - 5 - (2-fluorophenyl)-1,3-dihydro - 1 - (3 - morpholinopropyl)-2H-1,4-benzodiazepin-2-one monomaleate melting point 183–185°.

EXAMPLE 15

A solution of 5.9 grams of 7-chloro-5-(2-fluorophenyl)-1,3 - dihydro - 1 - (3 - morpholinopropyl) - 2H - 1,4-benzodiazepin-2-one in a mixture of 70 ml. of 3 N hydrochloric acid and 70 ml. of ethanol was refluxed for 9 hours. The ethanol was removed under reduced pressure and the residue made alkaline with ammonium hydroxide. The so-formed alkaline medium was extracted with dichloromethane. The dichloromethane extract was washed with brine, dried over anhydrous sodium sulfate, filtered and the filtrate concentrated to a small volume. The so-cencentrated dichloromethane solution was put on a column of neutral alumina and chromatographed with ethyl ether. Concentration of the ethyl ether gave 5-chloro - 2 - (3-morphinolinopropylamino)-2'-fluorobenzophenone as an oil. The so-obtained oil was dissolved in methanol and the resultant solution saturated with hydrogen chloride. The yellow solid which formed was recrystallized from methanol-ether and yielded 5-chloro-2-(3-morpholinopropylamino) - 2'-fluorobenzophenone hydrochloride as yellow needles of melting point 148–150°.

EXAMPLE 16

A solution of 1.3 grams of 1-(2-dimethylaminoethyl)-5 - phenyl - 7 - trifluoromethyl - 3H - 1,4 - benzodiazepin-2(1H)-one dihydrochloride in 50 ml. of ethanol and 40 ml. of 3 N hydrochloric acid was refluxed for 8 hours. The ethanol was removed under reduced pressure and the residue made alkaline with ammonium hydroxide. The so-formed alkaline medium was extracted with dichloromethane. The dichloromethane extract was washed with brine, dried over anhydrous sodium sulphate, filtered and concentrated to a small volume. The so-concentrated dichloromethane solution was put on a column of neutral alumina and chromatographed with ethyl acetate. Concentration of the ethyl acetate gave 2-(2-dimethylaminoethylamino)-5-trifluoromethylbenzophenone as an oil. The oil was dissolved in ethanol, which was saturated with hydrogen chloride. Upon treatment with ether, a yellow solid was obtained which upon recrystallization from ethanol-ether gave 5-trifluoromethyl-2-(2-dimethylaminoethylamino)benzophenone hydrochloride as yellow needles, melting point 203–205°.

EXAMPLE 17

To a stirred mixture of 900 ml. of pyridine and 200 ml. of 1,3-propanediamine were added 104 g. of 2-chloro-5-nitrobenzophenone. The reaction mixture was refluxed for 5 hours and then concentrated in vacuo to dryness. The residue was shaken with a mixture of methylene chloride and water. The organic layer was separated, dried and concentrated in vacuo to dryness. The residue was dissolved in 1 l. of 1.5 N hydrochloric acid, stirred and refluxed for 2 hours and then left at room temperature for 18 hours. The crystalline reaction product which formed was separated by filtration and recrystallized from methanol. After recrystallization from a mixture of methanol and ether, 2-(3-aminopropylamino)-5-nitrobenzophenone hydrochloride was obtained as yellow needles melting at 239–240°.

By treating the hydrochloride with sodium hydroxide, 2-(3-aminopropylamino) - 5 - nitrobenzophenone was obtained. Upon recrystallization of the last-mentioned base from ether, there appeared yellow needles melting at 97–98°.

EXAMPLE 18

A solution of 3.6 g. of 1-(3-dimethylaminopropyl)-1,3-dihydro-7-nitro-5-phenyl-2H-1,4-benzodiazepin-2-one hydrochloride in 50 ml. of a 50% mixture of ethanol and 3 N hydrochloric acid was heated on the steambath for 7 hours. The reaction mixture was diluted with ice water, made alkaline with dilute sodium hydroxide and extracted with methylene chloride. The organic layer was dried and concentrated in vacuo to dryness. The residue was crystallized and recrystallized from ether yielding 2-(3-dimethylaminopropylamino) - 5 - nitrobenzophenone as yellow prisms, melting point 105–106°.

2-(3-dimethylaminopropylamino)-5-nitrobenzophenone was dissolved in an excess of methanolic hydrogen chloride. The solution was concentrated in vacuo to dryness. The residue was crystallized from a mixture of methanol, isopropanol and ether. After recrystallization from the same solvent mixture, 2-(3-dimethylaminopropylamino)-5-nitrobenzophenone hydrochloride was obtained as yellow needles melting at 181–182°.

EXAMPLE 19

To a solution of 9.1 g. of 2-(3-aminopropylamino)-5-nitrobenzophenone in 50 ml. of formic acid was added 50 ml. of 40% aqueous formaldehyde. The mixture was heated on a steambath for 1.5 hours and then refluxed for 18 hours. The reaction mixture was poured onto ice, made alkaline with dilute sodium hydroxide and extracted with ether. The ether extract was dried and concentrated in vacuo to dryness. The residue was dissolved in ether and extracted with dilute hydrochloric acid. The aqueous acid layer was separated, made alkaline with dilute sodium hydroxide and extracted with ether. The last-mentioned ether extract was dried and concentrated in vacuo to dryness. The residue was dissolved in an excess methanolic hydrogen chloride and concentrated in vacuo to dryness. The salt was crystallized from a mixture of methanol, isopropanol and ether yielding 2-(3-dimethylaminopropylamino)-5-nitrobenzophenone hydrochloride melting at 180–181°.

EXAMPLE 20

A mixture of 50 g. of 7-bromo-1-(3-dimethylaminopropyl)-1,3-dihydro-5-phenyl-2H-1,4-benzodiazepin-2-one in 200 ml. of 3 N hydrochloric acid whe heated on a steambath for 4 hours. The reaction mixture was left at room temperature for 18 hours, diluted with water and extracted with ether. The aqueous acid layer was separated, made alkaline with dilute sodium hydroxide. It was thereafter extracted with ether. The ether layer containing 5-bromo-2-(3 - dimethylaminopropylamino)benzophenone was separated, dried and concentrated in vacuo to dryness. The residue was dissolved in 100 ml. of an excess of an ethanol, solution of maleic acid and the mixture was heated until complete solution was obtained. The solution was concentrated in vacuo to dryness. The residue was crystallized and recrystallized from a mixture of methylene chloride and ether yielding 5-bromo-2-(3-dimethylaminopropylamino)benzophenone maleate as yellow needles melting at 110–111°.

EXAMPLE 21

A solution of 0.013 m. of 5-chloro-2-paratoluenesulfonamido-benzophenone in 25 ml. of N,N-dimethylformamide was treated with 3.2 ml. of a solution of sodium methoxide in methanol [(containing 4.87 meq./ml.); 0.156 m.]. The mixture was stirred at room temperature for 30 minutes. A solution of 0.325 m. of dimethylaminopropyl chloride in 25 ml. of toluene was then added and the reaction mixture stirred at 55° for eighteen hours. The reaction mixture was next concentrated to an oil, dissolved in ether (200 ml.) and then washed with water (3× 100 ml.). The ether solution was extracted with 6 N hydrochloric acid (3× 50 ml.). The acid extracts were combined, washed with ether (100 ml.) made basic with ammonia and the resultant medium then extracted with ether (3× 100 ml.). The ether extracts were combined, washed with water, dried over anhydrous sodium sulfate and concentrated whereupon 5-chloro-2[N-(3-dimethylaminopropyl)-p-toulenesulfonamido]benzophenone crystallized. Upon recrystallization from a mixture of ether/petroleum ether, the product appeared as white prisms melting at 103–106°.

EXAMPLE 22

To 20 ml. of 70% (v./v.) sulfuric acid maintained at 105° was added 1.0 g. of 5-chloro-2-[N-(3-dimethylaminopropyl)-p-toluene-sulfonamido]benzophenone. The resultant solution was stirred, heated to 145° and then maintained at that temperature for 5 minutes. The solution was then poured over ice, made basic with concentrated ammonium hydroxide and extracted with ether (3× 50 ml.). The ether extracts were combined, washed with water, dried over anhydrous sodium sulfate and concentrated leaving 5-chloro-2-(3-dimethylaminopropylamino)benzophenone in the concentrate. An excess of a solution of dry hydrogen chloride in isopropanol was added to the so-formed concentrate yielding 5-chloro-2-(3-dimethylaminopropylamino)benzophenone hydrochloride. The salt was precipitated by the addition of ether as yellow prisms melting at 157–163°.

EXAMPLE 23

A solution of 17.4 g. (0.05 mole) of 7-chloro-1-(3-chloropropyl) - 1,3 - dihydro - 5 - phenyl-2H-1,4-benzodiazepin-2-one in 100 ml. of ethanol and 100 ml. of 3 N hydrochloric acid was refluxed overnight. The so-refluxed acidic solution was washed with ether, neutralized with aqueous sodium hydroxide and extracted with ether. The ethereal extract was dried and the solvent removed leaving a yellow oil. The yellow oil was chromatographed over alumina (Woelm neutral, activity 1). Elution with petrol and subsequent removal of the solvent gave 2-(3-chloropropylamino) - 5 - chlorobenzophenone, as yellow prisms melting point 60–62°.

EXAMPLE 24

A mixture of 9.0 g. (29.2 mmole) of 2-(3-chloropropyl amino)-5-chlorobenzophenone, 30 mmole of potassium iodide and an excess of ammonia in 25 ml. of ethanol was shaken at 100° in a sealed container for 4 hours. The reaction mixture was filtered and the filtrate reduced to dryness in vacuo. The residue was partitioned between 3 N sodium hydroxide and methylene chloride. The methylene chloride layer was washed with water, dried over anhydrous sodium sulfate and evaporated in vacuo to dryness. The residue was dissolved in benzene and chromatographed on a column of alumina (Woelm neutral, activity 1). After passing benzene through the column, elution with 1% ethanol in benzene gave a fraction which upon evaporation yielded 2-(3-aminopropylamino)-5-chlorobenzophenone as an oil. Adding the oil to an excess of a solution of dry hydrogen chloride in ether gave 2-(3-aminopropylamino)-5-chlorobenzophenone hydrochloride which after recrystallization from isopropanol-ether was obtained as yellow needles of melting point 170°.

EXAMPLE 25

A mixture of 5.0 g. (16 mmole) of 2-(3-chloropropylamino)-5-chlorobenzophenone, 16 mmole of potassium iodide and an excess of methylamine in ethanol was agitated at 100–119° for 4½ hr. in a sealed container. The reaction mixture was poured into 800 ml. of water containing a small amount of sodium hydroxide and extracted with methylene chloride. The methylene chloride extract was washed with water, dried over anhydrous sodium sulfate and the solvent removed leaving an oil. The oil was warmed in 3 N HCl and the so-warmed medium neutralized with sodium hydroxide. Extraction with methylene chloride and removal of the solvent gave a yellow oil which when treated with hydrogen chloride in ether gave 5-chloro-2-(3-methylaminopropylamino)-benzophenone hydrochloride, melting point 200–205°.

EXAMPLE 26

A mixture of 5.4 g. (17.5 mmole) of 2-(3-chloropropylamino)-5-chlorobenzophenone, 20 mmole of potassium iodide and 25 ml. (excess) of piperidine was refluxed overnight. The reaction mixture was filtered and the piperidine removed from the filtrate in vacuo. The residue was dissolved in methylene chloride and the resultant solution washed with 1 N sodium hydroxide and then with water. The solvent was removed in vacuo leaving 5-chloro-2-(3-piperidinopropylamino)benzophenone as a yellow oil. 5-Chloro-2-(3-piperidinopropylamino)benzophenone (hydrochloride was obtained by adding the oil to methanolic hydrogen chloride. Upon recrystallization from ethanol, the salt appeared as yellow plates of melting point 208–210°.

EXAMPLE 27

A solution of 16.7 g. (49.8 mmole) of 5-chloro-2-(3-dimethylaminopropylamino)-2'-fluorobenzophenone, 85 g. of hydroxylamine hydrochloride and 200 ml. of pyridine was refluxed for 24 hours. An additional 15 g. of hydroxylamine hydrochloride was added and the refluxing was continued for a total of 96 hours. The reaction mixture was poured into an iced excess of 3 N sodium hydroxide. Extraction of the so-cooled reaction mixture with methylene chloride, washing with water and removal of the solvent gave a solid. Crystallization of the solid from ether and subsequent recrystallization from ethanol gave colorless needles of 2-(3-dimethylaminopropylamino)-5-chloro-2'-fluorobenzophenone oxime, melting point 170–171°.

EXAMPLE 28

A mixture of 34.5 g. (0.103 mole) of 5-chloro-2-(3-dimethylaminopropylamino)-2' - fluorobenzophenone, 1.0 g. of zinc chloride and an excess of methylamine in 250 ml. of ethanol was sealed in a bomb under 1000 p.s.i. of nitrogen and shaken at 150° for about 3 hours. The reaction mixture was filtered and the filtrate reduced in vacuo to give a mixture of two isomeric 5-chloro-2-(3-dimethylaminopropylamino)-2′-methylamino benzophenone methylimines as yellow prisms, melting point 90–103°.

If desired, the isomers could be separated. Fractional recrystallization from hexane gave isomer $a$ melting at 109–111° and concentrate of the mother liquors gave isomer $b$ melting at 110–113°.

EXAMPLE 29

5.0 g. of 5-chloro-2-(3-dimethylaminopropylamino)-2′-methylamino benzophenone methylimine was dissolved in 50 ml. of ethanol and 100 ml. of 3 N hydrochloric acid. The solution was heated at reflux for 3½ hours, neutralized and extracted with methylene chloride and gave after drying and removal of the solvent in vacuo an orange oil. Crystallization from hexane-petrol gave 5-chloro-2-(3-dimethylaminopropylamino) - 2′ - methylaminobenzophenone of yellow prisms, melting point 85–87°.

EXAMPLE 30

A mixture of 13.0 g. of 7-chloro-2,3-dihydro-5-phenyl-1H-1,4-benzodiazepine and 100 ml. of ethyl iodide was refluxed on a steam bath for one hour. The so-refluxed mixture was evaporated to dryness in vacuo. The residue was dissolved in a small amount of methanol and the resulting solution added to one and one-half liters of water. The pH of the resulting medium was adjusted to 7–8 with ammonium hydroxide. Tars were removed by filtration through cotton. The aqueous solution was washed with ether and evaporated to dryness in vacuo. Isopropanol was added to the residue and 7-chloro-2,3-dihydro-4-ethyl-5-phenyl-1H - 1,4 - benzodiazepin-4-ium iodide separated as yellow crystals melting at 208–212°. Recrystallization from a methanolether mixture gave the product as yellow prisms melting at 210–212°.

A mixture of 2.8 g. (6.8 mmole) of 7-chloro-2,3-dihydro-4-ethyl-5 - phenyl - 1H - 1,4 - benzodiazepin-4-ium iodide in 300 ml. of water and 50 ml. of ethanol was stirred at room temperature. An equimolar amount of 1 N sodium hydroxide solution was carefully added to the so-stirred mixture. The reaction mixture was diluted with an additional 100 ml. of water and extracted with ether. The ether extract was washed three times with water and once with brine. The so-washed ether extract was dried over sodium sulfate and reduced in vacuo to a yellow oil. The oil was crystallized from petroleum ether. Upon recrystallization from petroleum ether 7-chloro-2-(2-ethylaminoethylamino)-benzophenone was obtained as yellow rods, melting at 64–66°.

EXAMPLE 31

A mixture of 32.0 g. of 7-chloro-2,3-dihydro-5-(2-fluorophenyl)-1H-1,4-benzodiazepine and 260 ml. of ethyl iodide was refluxed on a steam bath for two hours. The excess ethyl iodide was removed in vacuo. The residue remaining after removal of the excess iodide was dissolved in warm isopropanol, ether was added, and 7-chloro-2,3-dihydro-4-ethyl - 5 - (2-fluorophenyl)-1H-1,4-benzodiazepin-4-ium iodide as a red crystalline precipitate appeared melting at 242–245°. Recrystallizatiton from methylene chloride-isopropanol-ether gave the quaternary iodide as orange rods melting at 244–247°.

A solution of 15.0 g. (34.8 mmole) of 7-chloro-2,3-dihydro-4-ethyl-5-(2′-fluorophenyl) - 1H-1,4-benzodiazepin-4-ium iodide and 300 ml. methanol was stirred at room temperature. An equimolar amount of 1 N sodium hydroxide was carefully added to the so-stirred medium. The methanol was removed in vacuo and 200 ml. of water was added to dissolve the residual yellow oil. The aqueous solution was extracted several times with ether, and the combined ether extracts were washed twice with water, once with brine, dried over sodium sulfate, and reduced in vacuo to give 7-chloro-2-(2-ethylaminoethylamino)-2′-fluorobenzophenone as a yellow oil. The oil was dissolved in a small amount of absolute ethanol. Upon addition of an excess of a solution of ethanolic hydrogen chloride to the so-formed medium 7-chloro-2-(2-ethylaminoethylamino) - 2′ - fluorobenzophenone monohydrochloride precipitated as yellow crystals, melting at 205–215°.

EXAMPLE 32

A tablet dosage form was prepared containing the following ingredients:

| Ingredients: | Per tablet, mg. |
|---|---|
| 5 - chloro-2-(3-dimethylaminopropyl)-amino-2′-fluorobenzophenone hydrochloride | 25 |
| Lactose, spray dried | 72 |
| Corn starch, U.S.P. | 2 |
| Calcium stearate | 1 |
| Total weight | 100 |

The procedure for preparing the tablet dosage form was as follows:

In a suitable mixer, the 5-chloro-2-(3-dimethylaminopropyl)-amino-2′-fluorobenzophenone hydrochloride, lactose, the corn starch and the calcium stearate were blended. The mixed powder was compressed on a heavy duty tablet comprising machine to yield tablet slugs of about 1″ diameter and ¼″ thickness. The tablet slugs were passed through a suitable comminuting machine to yield granules of approximately 16 mesh with a minimum of fines. The granulation was recompressed on a tablet compressing machine using a ¼″ standard concave punch to an average tablet weight of 100 mg.

EXAMPLE 33

A capsule dosage form containing the following ingredients was prepared as follows:

| Ingredient: | Per capsule, mg. |
|---|---|
| 5-chloro - 2 - (3-dimethylaminopropyl)amino-2′-fluorobenzophenone hydrochloride | 5 |
| Lactose | 163 |
| Corn starch | 37 |
| Talc | 5 |
| Total weight | 210 |

The procedure for preparing the capsule dosage form is as follows:

Mix the active component with the lactose and the corn starch in a suitable mixer. Further blend the mixture by passing it through a Fitzpatrick Comminuting Machine with a No. 1A screen with knives forward. Return the blended powder to the mixer. Add the talc and blend thoroughly. Fill into No. 4 hard shell gelatin capsules on a Parke Davis or similar type capsulating machine.

EXAMPLE 34

A suppository dosage form was prepared containing the following ingredients:

| Ingredient: | Per 1.3 gm. suppository, gm. |
|---|---|
| 5-chloro-2-(3 - dimethylaminopropyl)amino-2′-fluorobenzophenone hydrochloride | 0.010 |
| Wecobee M [1] | 1.245 |
| Carnauba Wax | 0.045 |

[1] A refined synthetic cocoa butter, coconut derived. Available commercially from F. F. Drew Company, New York, N.Y.

The procedure for preparing the suppository dosage form was as follows:

The Wecobee M and the carnauba wax were melted in a suitable size glass lined container. The melt was mixed well and then cooled to 45°. The 5-chloro-2-(3-dimethylaminopropyl)amino-2′-fluorobenzophenone hydrochloride, which had been reduced to a fine powder with no lumps, was added to the so-cooled melt and stirred until completely and uniformly dispersed therein. The mixture was poured into suppository molds to yield suppository dosage forms having an individual weight of 1.3 gms. The suppositories were cooled and removed from molds. They were then individually wrapped in wax paper for packaging.

EXAMPLE 35

A dosage form of 5-chloro-2-(3-dimethylaminopropyl) amino-2'-fluorobenzophenone hydrochloride suitable for parenteral use was prepared as follows:

50 mg. of parenteral grade 5-chloro-2-(3-dimethylaminopropyl)-amino-2'-fluorobenzophenone hydrochloride, fiber free, was filled into a 5 cc. ampul utilizing a Diehl Mater electric filler. The ampuls were sealed and sterilized at 255° F. for 2 hours.

Immediately before use, the powder is solubilized with 5 cc. of water for injection, U.S.P.

We claim:

1. A compound selected from the group consisting of compounds of the formula

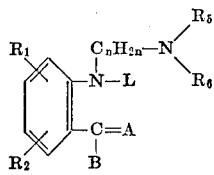

wherein A is selected from the group consisting of oxygen, NOH, NH and N-lower alkyl; $n$ is a whole integer from 2–7; L is a leaving group selected from the group consisting of benzene sulfonyl and tosyl; B is selected from the group consisting of phenyl and $R_4$-phenyl wherein R$_4$ is selected from the group consisting of hydrogen, halogen, trifluoromethyl, nitro, amino and lower alkoxy; $R_1$ and $R_2$ are selected from the group consisting of hydrogen, halogen, lower alkyl, trifluoromethyl, nitro, amino and lower alkoxy and, $R_5$ and $R_6$ are hydrogen and lower alkyl.

2. The compound of claim 1 wherein L is a tosyl group.

3. The compound of claim 2 wherein one member of $R_1$ and $R_2$ is hydrogen and the other is halogen, said halogen being substituted at the 5-position of the phenyl ring.

4. The compound of claim 3 wherein said halogen at the 5-position of the phenyl ring is chlorine.

5. The compound of claim 3 wherein $n$ is 3, one member of groups $R_5$ and $R_6$ is hydrogen and the other is lower alkyl, and B is $R_4$-phenyl wherein $R_4$ is a halogen group substituted at the 2'-position.

6. The compound of claim 3 wherein $n$ is 3, both members of groups $R_5$ and $R_6$ are lower alkyl, and B is $R_4$-phenyl wherein $R_4$ is a halogen group substituted at the 2'-position.

7. The compound of claim 5 wherein said halogen at the 2'-position is flourine.

8. The compound of claim 2 wherein one member of $R_1$ and $R_2$ is halogen and the other is nitro, $n$ is 3, $R_5$ and $R_6$ are both lower alkyl and B is phenyl.

References Cited

UNITED STATES PATENTS 3,131,178 4/1964 Archer et al. _____ 260—570
3,455,985 7/1969 Sternbach et al. ____ 260—556A HENRY R. JILES, Primary Examiner S. D. WINTERS, Assistant Examiner